United States Patent

Steinel et al.

[11] Patent Number: 6,033,342
[45] Date of Patent: Mar. 7, 2000

[54] DRIVE TRAIN ARRANGEMENT FOR A MOTOR VEHICLE DRIVEN BY AN INTERNAL COMBUSTION ENGINE

[75] Inventors: Klaus Steinel, Bergrheinfeld; Hans-Jürgen Drexl, Schonungen; Gerhard Tebbe, Geldersheim, all of Germany

[73] Assignee: Mannesmann Sachs AG, Schweinfurt, Germany

[21] Appl. No.: 09/250,189

[22] Filed: Feb. 16, 1999

[30] Foreign Application Priority Data

Feb. 17, 1998 [DE] Germany ............... 198 06 497

[51] Int. Cl.[7] .................................................. B60K 41/02
[52] U.S. Cl. .............................. 477/181; 477/175
[58] Field of Search ........................ 477/174, 175, 477/181, 90, 91

[56] References Cited

U.S. PATENT DOCUMENTS

| 4,072,221 | 2/1978 | Phinney | 477/112 |
| 5,072,631 | 12/1991 | Fujimoto et al. | 477/107 |
| 5,378,211 | 1/1995 | Slicker et al. | 477/181 |
| 5,457,633 | 10/1995 | Palmer et al. | 477/181 |

FOREIGN PATENT DOCUMENTS

| 140 208 | 5/1985 | European Pat. Off. |
| 41 18 736 | 12/1991 | Germany |
| 196 34 203 | 3/1997 | Germany |

*Primary Examiner*—Sherry L. Estremsky
*Attorney, Agent, or Firm*—Cohen, Pontani, Lieberman & Pavane

[57] ABSTRACT

A drive train arrangement for a motor vehicle driven by an internal combustion engine. The engine output or torque of the internal combustion engine (1) is controllable by means of an engine output control (11) via a user-operated accelerator pedal (15). A friction-gearshift clutch (3) is arranged in the torque transmission path of the internal combustion engine (1). To allow the friction-gearshift clutch (3) to be designed for reduced transmission reliability, a slip control (39) reduces the engine output or torque of the internal combustion engine (1) for a time-limited period via the engine output control (11) when the friction-gearshift clutch (3) slips in its fully engaged state. To this end, the slip control (39) responds to a clutch position sensor (41) that detects the engagement position of the friction-gearshift clutch (3), and to speed sensors (43, 45) that detect the input and output speeds of the friction-gearshift clutch (3).

11 Claims, 3 Drawing Sheets

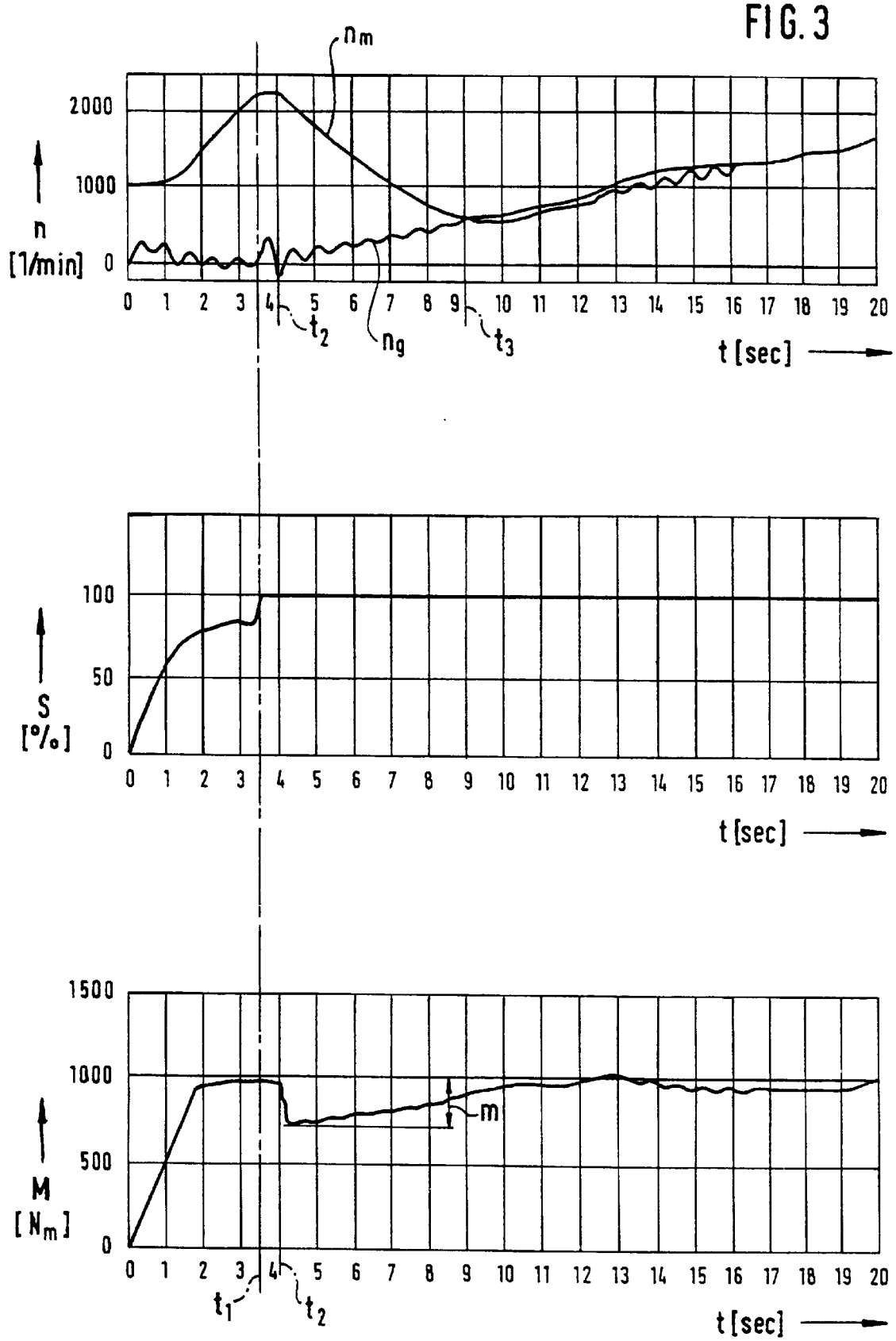

DRIVE TRAIN ARRANGEMENT FOR A MOTOR VEHICLE DRIVEN BY AN INTERNAL COMBUSTION ENGINE

BACKGROUND OF THE INVENTION

1. Field of the Invention

The invention relates to motor vehicles, and more particularly to a drive train arrangement for a motor vehicle driven by an internal combustion engine.

2. Description of the Related Art

In the torque transmission path of conventional drive train arrangements for motor vehicles, a friction-gearshift clutch is arranged between the internal combustion engine and a speed-change gear, which may be a multi-speed, manually-shifted gear. To start the vehicle or change the speeds of the speed-change gear, the driver engages and disengages the friction-gearshift clutch by means of a clutch pedal. To automate the gearshift clutch, an actuator can be provided instead of the clutch pedal.

The transmission capacity of the friction-gearshift clutch (i.e., the amount of torque capable of being transmitted by the clutch) depends primarily on the pressure force of the clutch main spring and the coefficient of friction of the friction lining material of the clutch disk. The transmission capacity can be subject to temperature-dependent fluctuations (fading). In order to ensure that the gearshift clutch reliably transmits the torque for which it has been designed, even under favorable operating conditions (e.g., when the coefficient of friction of the friction lining is relatively low), relatively high transmission reliability has been required. The transmission reliability is the ratio of the slip moment of the gearshift clutch when the clutch is exercising its maximum pressure force on the friction linings to the maximum engine torque. The slip moment at maximum pressure force is the product of the maximum pressure force exerted by the gearshift clutch (i.e., its pressure plate) on the friction linings multiplied by the coefficient of friction of the friction linings multiplied by the mean friction radius multiplied by the number of friction surfaces. In conventional gearshift clutches, the nominal transmission reliability, based on a coefficient of friction of 0.25, is approximately 1.3 to 1.5. However, the effective transmission reliability is approximately 2.3 to 2.5, since the effective or actual coefficient of friction during normal driving is approximately 0.4.

Because conventional friction-gearshift clutches are designed for very high effective transmission reliability, the entire drive train of the motor vehicle is heavily stressed during dynamic processes, e.g. during abrupt clutch engagement or while undergoing rotary vibration resonances. For this reason, not only the components of the gearshift clutch, but also the other parts of the drive train, must be of sturdy design so as to be able to tolerate even the rarely reached torque limit values. The trend toward higher engine torques also makes necessary higher pressure forces of the diaphragm spring, which usually serves as the clutch main spring. Moreover, the useful life of such strong diaphragm springs must also be taken into account. Finally, the requirement for high transmission reliability (and thus high spring forces of the clutch main spring) results in high activation forces in the clutch disengagement system, so that the components arranged in the power flow of the clutch disengagement system are also more strongly loaded and thus must also be sturdily designed.

SUMMARY OF THE INVENTION

It is therefore an object of the invention to provide a friction-gearshift clutch arrangement in the torque transmission path of a motor vehicle drive train arrangement which accomodates reduced values of transmission reliability without sacrificing or diminishing operational abilities or functionality.

This and other objects are achieved in accordance with an embodiment of the invention wherein a drive train arrangement for a motor vehicle driven by an internal combustion engine has a friction-gearshift clutch arranged in the torque transmission path of the internal combustion engine, a controllable output adjustment device for the internal combustion engine, for example in the form of a fuel injection pump system, and an engine output control that controls the output adjustment device and responds to a driver-operated accelerator pedal. The drive train arrangement comprises a clutch position sensor for determining the position of the friction-gearshift and for generating an engagement position signal representing a response to a maximum torque transmission capacity position of the friction-gearshift; slip sensor means operable to ascertain a slip state of the friction-gearshift clutch; and a slip control responsive to the engagement position signal and the slip sensor means for controlling the engine output control, to reduce a value of the engine output or the engine torque in a time-limited manner when a slip state of the friction-gearshift clutch is detected in the engagement position. The engine output value or engine torque is determined by means of the accelerator pedal.

When a friction-gearshift clutch in a drive train arrangement according to the invention is designed for a relatively low transmission reliability of 1.5, for example, the clutch can slip even in the fully engaged state under certain operating conditions (e.g., when heating of the friction linings leads to fading, or during excessive dynamic stress). The slip control of the invention detects this slip state in the engagement position and reduces the engine output or engine torque of the internal combustion engine via the engine output control as for example by electronically intervening in the control of the injection system, until sufficient transmission capacity of the friction-gearshift clutch again exists. Since the transmission reliability for which this friction-gearshift clutch has been designed is lower than that which is taught by the prior art, not only can the gearshift clutch be less sturdily designed, but other components of the drive train and clutch disengagement system can similarly be designed for lower loads.

Advantageously, the slip control, during the time period in which it reduces the engine output or the engine torque, blocks any increase in the engine output or the engine torque determined by means of the accelerator pedal. As a result, the driver cannot influence the reduction in engine output or engine torque via the accelerator pedal.

In a preferred embodiment, the slip control reduces the value of the engine output or engine torque for a predetermined period of time and, in particular, for a predetermined time interval beyond the end of the slip state. The slip control thus permits an increase in engine torque only after a predetermined time beyond the slip state has elapsed, so that the gearshift clutch has more time for cooling and reversing of the fading effect.

The slip control can reduce the engine output or engine torque to a set constant value. However, since it is desirable that the driver notice the intervention in engine output control as little as possible, this value can advantageously be changed or varied in response to sensor signals from at least one sensor and in accordance with a predetermined value as detected by the at least one sensor. Preferably, the predetermined value can itself be changed in dependence on the slip sensor means. In other words, the slip control will reduce the engine output or engine torque as a function of the amount of slip detected by the slip sensor means.

The slip control can be implemented as an open control loop that changes the engine output or engine torque without feedback. However, for reasons of driving comfort as well as response accuracy and speed, it is preferable to provide a control circuit that, during the period of reduction, maintains the engine output or engine torque to a stored value within nominal limits.

The sensors can be relatively simple. For example, the clutch position sensor can be embodied as a limit switch on the clutch pedal. The slip sensor means can be implemented as speed sensors that detect the speed of the internal combustion engine, on the one hand, and the output speed of the friction-gearshift clutch or the input speed of the speed-change gear, on the other. Instead of a speed sensor that detects the output speed of the friction-gearshift clutch, it is possible, as long as the speed-change gear is equipped with a gear position sensor, to use a speed sensor that detects the output speed of the speed-change gear, or a speed sensor that detects the wheel speed and normally provides the tachometer signal. It is then possible, for the purpose of determining slip, to derive the input speed of the speed-change gear and thus the output speed of the friction-gearshift clutch from the output speed of the speed-change gear and the gear translation set by the currently engaged gear.

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention.

BRIEF DESCRIPTION OF THE DRAWINGS

In the drawings, wherein like reference characters denote similar elements throughout the several views:

FIG. 3 is a time-dependency diagram of engine and transmission speed, clutch pedal position and engine torque for a drive train arrangement according to an embodiment of the invention.

DETAILED DESCRIPTION OF THE PREFERRED EMBODIMENTS

Figure 1:
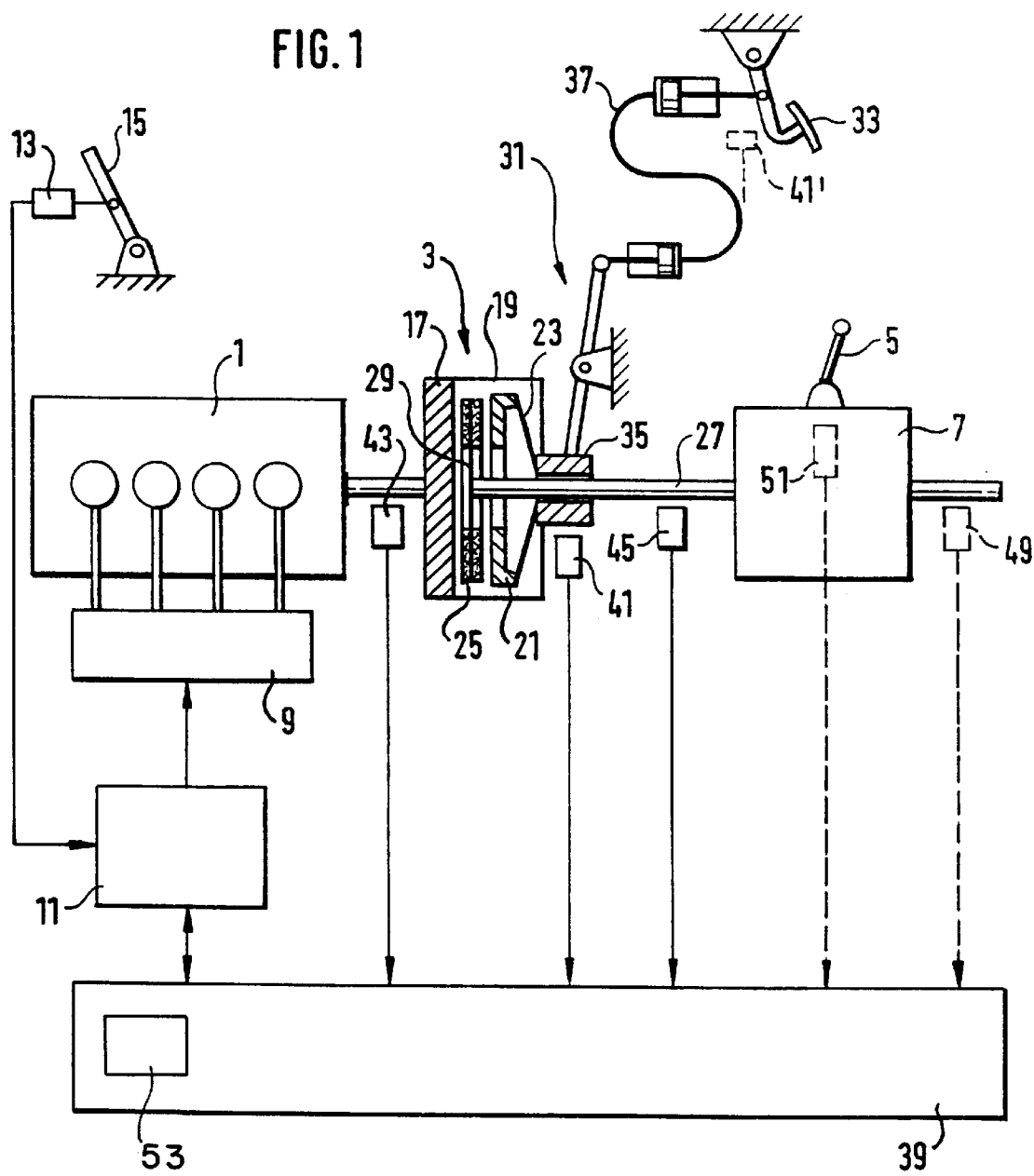
FIG. 1 is a schematic block diagram of a drive train arrangement of a motor vehicle according to an embodiment of the invention.

FIG. 1 shows a schematic block representation of the inventive drive train arrangement for a motor vehicle. An internal combustion engine 1 which is manually shifted by means of a shifting lever 5 via a friction-gearshift clutch 3 and a speed-change gear 7 drives driving wheels (not shown) of the motor vehicle. The internal combustion engine 1 has a fuel injection pump system 9, whose delivery capacity is controlled as a function of the position of an accelerator pedal 15 operated by the vehicle driver as determined by a sensor 13. The driver can influence the engine torque and thus the engine output using accelerator pedal 15. Instead of a fuel injection pump system 9, a conventional carburetor can be used so long as its throttle flap is equipped with an actuator controllable by the engine output control 11.

The friction-gearshift clutch 3 is conventionally embodied and generally comprises a flywheel 17 (e.g. a dual-mass flywheel) connected to the crankshaft of internal combustion engine 1. A pressure plate 21 is axially movable with respect to flywheel 17, but does not rotate about the axis. The pressure plate 21 is prestressed toward the flywheel 17 by a clutch main spring 23, (e.g. a diaphragm spring). Seated between the friction surfaces of flywheel 17 and pressure plate 21 is a clutch disk 29 having friction linings 25. The clutch disk 29 is connected in rotation-proof fashion to an input shaft 27 of speed-change gear 7.

An activation arrangement 31 allows gearshift clutch 3, which is fully engaged in its rest or unactuated state, to be disengaged and re-engaged by the driver of the motor vehicle via clutch pedal 33. The activation arrangement 31 comprises a disengagement mechanism 35, which acts on diaphragm spring tongues of clutch main spring 23 embodied as a diaphragm spring. The disengagement mechanism 35 is connected to clutch pedal 33 via a power transmission device 37, e.g. a hydraulic drive. Instead of hydraulic power transmission device 37, other power transmission mechanisms can alternatively be utilized, as for example in the form of cable or rod arrangements. The clutch pedal 33 can also be replaced by an automatic actuator which would result in the elimination of power transmission device 37. Of course, speed-change gear 7 can be similarly automated.

The transmission capacity of gearshift clutch 3 (i.e. the torque capable of being transmitted by gearshift clutch 3) depends on the force or pressure with which clutch main spring 23 presses pressure plate 21 against flywheel 17 via friction linings 25 of clutch disk 29. The higher the pressure force, the greater the torque transmittable by gearshift clutch 3 in the fully engaged state (i.e., when clutch pedal 33 has no load). Because the transmission capacity of the gearshift clutch 3 can decrease as a result of friction lining heating or dynamic processes (e.g. abrupt engagement or resonance vibrations in the drive train), torques that are larger than the maximum torque produced by the internal combustion engine 1 can be present between the input and the output of the engaged gearshift clutch 3. The gearshift clutch 3 must therefore be designed for a certain transmission reliability. The gearshift clutch 3, in the fully engaged state, should be able to transmit a torque greater than the maximum torque produced by the internal combustion engine 1. To avoid having to oversize the drive train of the motor vehicle (especially gearshift clutch 3 and activation arrangement 31) for the purpose of attaining the heretofore required excessive transmission reliability, gearshift clutch 3 has a slip control 39 which, when gearshift clutch 3 is fully engaged, reduces the motor torque produced by the internal combustion engine 1 in a time-limited manner that cannot be influenced by the driver.

The slip control 39 detects the engagement position of gearshift clutch 3 by means of a position sensor 41. The engagement position is defined as the sensed maximum torque transmission capacity position of the friction-gearshift clutch. In the example shown, the position sensor responds to the clutch disengagement mechanism 35. However, as indicated at 41', the position sensor can also detect the rest position of clutch pedal 33. Using a speed sensor 43 for detecting the engine speed of the internal combustion engine 1, and a transmission speed sensor 45 responsive to the input speed of speed-change gear 7 (i.e. the output speed of gearshift clutch 3), the slip control 39 dynamically determines whether a slip state of the gearshift clutch 3 exists, i.e. whether the clutch is slipping. Slip control 39 is implemented as a control loop that influences engine output control 11. If position sensor 41 determines that gearshift clutch 3 is fully engaged, and speed sensors 43, 45 nonetheless detect a speed differential, then slip control 39 reduces the engine torque produced by the internal combustion engine 1 to reestablish the torque value transmittable by the gearshift clutch 3. The engine torque can thereby be reduced to an extent sufficient to stop slipping of the gearshift clutch 3, i.e. so that speed sensors 43, 45 then detect the same speeds. However, it is also contemplated that the engine torque can be reduced by amounts that do not suffice for complete slip suppression.

As slip control 39 reduces the engine torque, it blocks engine output control 11 against any deliberate increase in engine torque by means of accelerator pedal 15. The slip control 39 includes a control circuit 53 that ensures that the torque reduction is maintained at least a certain or predetermined period of time, so as to ensure cooling of the gearshift clutch 3. This allows the fading state to be reversed and the higher coefficient of friction of friction linings 25 in the cooled state to be reestablished. This time period may for example be a predetermined time interval that begins with the beginning of the engine torque reduction. On the other hand, the torque demanded by the driver via accelerator pedal 15 after the slip state is detected can be reduced to such an extent that no additional slip reduction by slip control 39 is necessary. In such cases, slip control 39 advantageously ensures that the torque cannot be increased beyond the previously set reduced torque value for a predetermined time interval, i.e. a certain dead time. Here, and in the previously described variations, the value by which slip control 39 reduces the engine torque is preferably dependent on the amount of slip detected with the help of speed sensors 43, 45.

In the various embodiments described above, speed sensors 43 and 45 directly detect the differential speed between the input and output of gearshift clutch 3, respectively. In lieu of speed sensor 45, the current gear position of speed-change gear 7 may be determined using a gear position sensor 51 and a speed sensor 49 to detect the output speed of speed-change gear 7. In this modified embodiment, slip control 39 calculates the input speed of speed-change gear 7 from its output speed and the translation ratio determined by the gear position. Speed sensor 49 is usually present in the form of a tachometer sensor.

Figure 2:
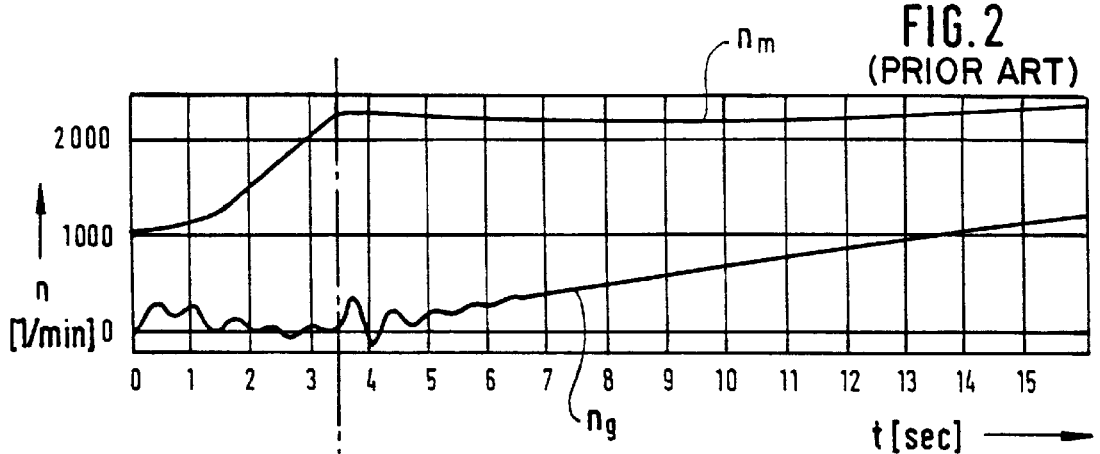
FIG. 2 is a time-dependency diagram of engine and transmission speed, clutch pedal position and engine torque for a conventional drive train arrangement of a motor vehicle.
Figure 2:
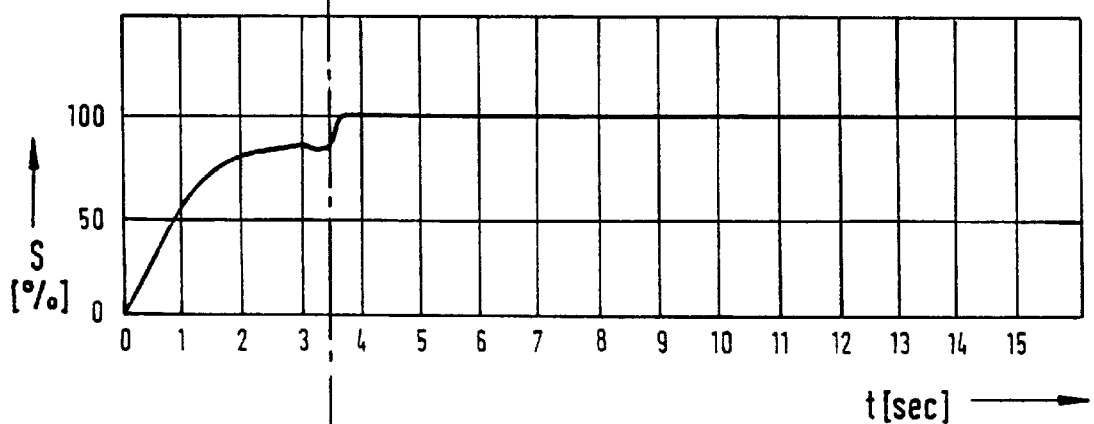
Figure 2:
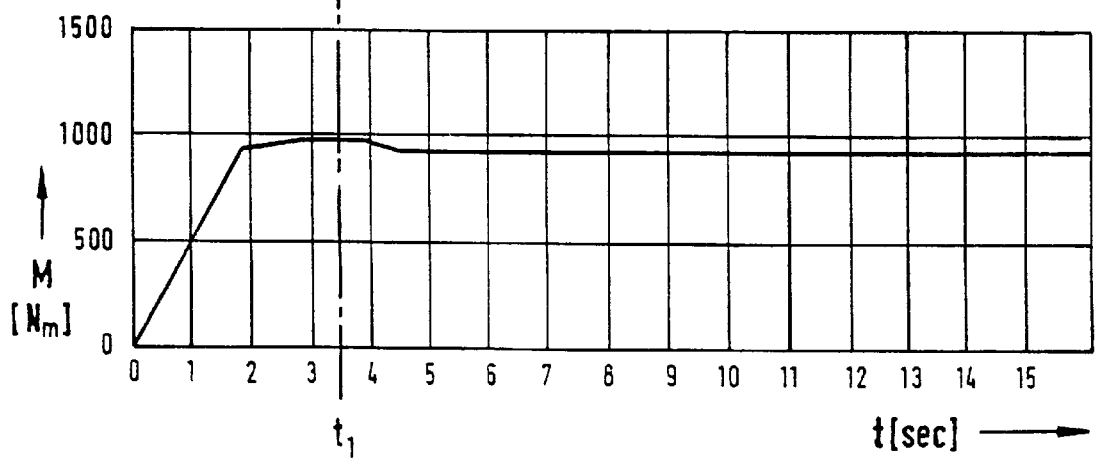

FIGS. 2 and 3 show, as a function of the time parameter t, graphs of the engine speed $n_m$ of the internal combustion engine and the gear input speed $n_g$ of the speed-change gear (upper graph); the path s of the clutch disengagement mechanism of the gearshift clutch (middle graph); and the engine torque M produced by the internal combustion engine (lower graph). FIG. 2 depicts these relationships for a conventional (prior art) drive train arrangement without slip control, and FIG. 3 shows these relationships for a drive train arrangement according to the invention with slip control, together with a starting process in first gear of the speed-change gear.

At time t=0, the gearshift clutch is disengaged, and the engagement process begins and is completed at time $t_1$, at which the clutch disengagement mechanism has attained its end engagement position.

Due to fading of the friction linings, however, the conventional clutch begins to slip. As the upper graph in prior art FIG. 2 shows, this is expressed as a long-lasting difference between the engine speed $n_m$ and the gear input speed $n_g$. Beginning with the engagement of the gearshift clutch at time $t_1$, the differential speed of the clutch, i.e. its slip, only decreases very gradually, due to the fading-based reduction in the transmission capacity of the clutch.

FIG. 3 shows the performance of the drive train arrangement according to the invention. Here, too, the clutch disengagement mechanism attains its position of complete clutch engagement at time $t_1$ (middle graph). At time $t_2$, the slip control 39 determines that a slip state exists and reduces the engine torque M (lower graph) by a differential value m. Accordingly, the engine speed $n_m$ (See FIG. 3, upper graph) also decreases. After a relatively short time (e.g., at time $t_3$) the engine speed $n_m$ and the gear input speed $n_g$ have become equal to each other, indicating that the clutch has stopped slipping. The engine torque M is thus once again fully transmitted by the gearshift clutch without any fading effect.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A drive train arrangement for a motor vehicle driven by an internal combustion engine power plant and having a friction-gearshift clutch arranged in a torque transmission path of the internal combustion engine, a controllable output adjustment device for adjusting output power generated by the internal combustion engine, and an engine output controller responsive to a user-operated accelerator pedal for controlling the output adjustment device, said drive train arrangement comprising:

a clutch position sensor for producing an engagement position signal when the clutch is in a sensed maximum torque transmission capacity position;

slip sensor means for detecting slippage of the friction-gearshift clutch; and a slip control responsive to said engagement position signal and said slip sensor means for controlling the engine output controller to reduce the engine output in a time-limited manner from a then-current value determined by the accelerator pedal to a reduced value in response to detected slippage of the clutch to thereby stop clutch slippage and re-establish efficient torque transmission through the clutch.

2. The drive train arrangement of claim 1, wherein said slip control further operates the engine output controller to prevent increases in the engine output from said reduced value in response to user-operation of the accelerator pedal during said reduction in engine output by said slip control.

3. The drive train arrangement of claim 1, wherein said slip control is operable for reducing the engine output for a time interval that extends beyond an end of the detected slippage for a predetermined period of time.

4. The drive train arrangement of claim 1, wherein said slip control is operable for reducing the engine output to a reduced value based on an amount of slippage detected by said slip sensor means.

5. The drive train arrangement of claim 1, wherein said slip sensor means further comprises speed sensors for detecting an operating speed of the internal combustion engine and an output speed of the friction-gearshift clutch.

6. The drive train arrangement of claim 1, wherein said slip sensor means further comprises:

a speed sensor for detecting an operating speed of the internal combustion engine;

a speed sensor for detecting an output speed of a speed-change gear downstream of the friction-gearshift clutch in the torque transmission path of the internal combustion engine; and a gear position sensor for detecting the gear position of the speed-change gear.

7. The drive train arrangement of claim 1, wherein the engine output controller comprises a fuel injection pump system.

8. The drive train arrangement of claim 1, wherein said slip control is operable for reducing the engine output value to a predetermined reduced value.

9. The drive train arrangement of claim 8, wherein said slip control further comprises a control circuit for maintaining the engine output value to said predetermined value for a predetermined time period for reduction.

10. The drive train arrangement of claim 8, further comprising a sensor for sensing a predetermined characteristic of the drive train, and wherein said predetermined reduced value is changed in dependence on said sensed predetermined characteristic.

11. The drive train arrangement of claim 8, wherein said slip control is operable for changing said predetermined reduced value in dependence on said slip sensor means.

* * * * *